(12) United States Patent
Slogsnat et al.

(10) Patent No.: US 11,630,012 B2
(45) Date of Patent: Apr. 18, 2023

(54) PRESSURE SENSOR WITH IMPROVED DETECTION ACCURACY AND COMPACT DESIGN

(71) Applicant: Robert Bosch GmbH, Stuttgart (DE)

(72) Inventors: David Slogsnat, Tuebingen (DE); Joachim Kreutzer, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/649,832

(22) Filed: Feb. 3, 2022

(65) Prior Publication Data
US 2022/0276108 A1 Sep. 1, 2022

(30) Foreign Application Priority Data
Feb. 26, 2021 (DE) ...................... 10 2021 104 607.6

(51) Int. Cl.
*G01L 9/00* (2006.01)
(52) U.S. Cl.
CPC .................................. *G01L 9/0072* (2013.01)
(58) Field of Classification Search
None
See application file for complete search history.

(56) References Cited

U.S. PATENT DOCUMENTS

| 8,129,802 | B2* | 3/2012 | Fukuda | B81C 1/00246 |
| | | | | 257/415 |
| 2013/0234263 | A1* | 9/2013 | Ikehashi | G01L 9/0044 |
| | | | | 257/415 |
| 2017/0038273 | A1* | 2/2017 | Krauss | G01N 27/4067 |
| 2019/0383684 | A1* | 12/2019 | Kollias | G01L 9/12 |

FOREIGN PATENT DOCUMENTS

DE 102018222770 A1 6/2020

* cited by examiner

*Primary Examiner* — Brandi N Hopkins
*Assistant Examiner* — Nigel H Plumb
(74) *Attorney, Agent, or Firm* — Norton Rose Fulbright US LLP; Gerard Messina

(57) ABSTRACT

A pressure sensor includes a micromechanical sensor element including a pressure-sensitive diaphragm, which spans a cavity in a base material and includes a diaphragm electrode. A fixed counter electrode is situated inside the cavity and, with the diaphragm electrode, forms a first measuring capacitor for detecting a first measuring pressure. A reference capacitor is situated inside the cavity and includes a first and a second fixed reference electrode. The pressure sensor is operable in a first operating mode, in which the first measuring capacitor and the first reference capacitor are interconnected in a first bridge circuit. The pressure sensor is operable in a second operating mode, in which the diaphragm electrode, the counter electrode and the reference electrodes are interconnected in such a way that the diaphragm electrode, together with the at least one first reference electrode, forms a second measuring capacitor for detecting a second measuring pressure.

13 Claims, 5 Drawing Sheets

PRESSURE SENSOR WITH IMPROVED DETECTION ACCURACY AND COMPACT DESIGN

CROSS REFERENCE

The present application claims the benefit under 35 U.S.C. § 119 of German Patent Application No. DE 10 2021 104 607.6 filed on Feb. 26, 2021, which is expressly incorporated herein by reference in its entirety.

FIELD

The present invention relates to a pressure sensor and to a method for operating a pressure sensor.

BACKGROUND INFORMATION

Pressure sensors including microelectromechanical structures (MEMS) for the capacitive measurement of a pressure are available in the related art. Usually, such conventional pressure sensors are predominantly used in a pressure range of 300 mbar to 1100 mbar. A pressure sensor may, for example, be optimized in a pressure range to the effect that its sensitivity is increased, by which smaller changes of an ambient pressure may be detected. This may enable, for example, a floor recognition within the scope of an interior-room navigation.

In certain applications, however, a higher pressure may also act, for example when pressure peaks occur temporarily. So-called in-ear headphones including an integrated pressure sensor, which are inserted into the ear and, in the process, momentarily do not allow a pressure equalization, are one example of this. As a result, the pressure sensor of such headphones may be used, for example, to recognize whether headphones are situated in the ear, for example so that music may be started.

Diving computers represent another area of use, whose pressure sensors also have to cover higher pressure ranges during a dive.

During dives, additionally larger pressure changes are present than in air. In this case, a lower sensitivity of a pressure sensor may be accepted than in an ambient pressure range. It is conventional to use a multitude of pressure sensors for different pressure ranges.

SUMMARY

It is an object of the present invention to provide an improved pressure sensor and to provide a method for operating a pressure sensor. This object may be achieved by a pressure sensor and by a method for operating a pressure sensor in accordance with example embodiments of the present invention. Advantageous refinements and embodiments of the present invention are disclosed herein.

A pressure sensor includes at least one micromechanical sensor element including at least one pressure-sensitive diaphragm. The diaphragm spans a cavity in a base material and includes a diaphragm electrode. At least one fixed counter electrode is situated inside the cavity and, together with the diaphragm electrode, forms a first measuring capacitor for detecting a first measuring pressure. At least one reference capacitor is situated inside the cavity and includes at least one first and one second fixed reference electrode. The pressure sensor is characterized in that it is operable in at least one first operating mode, in which the first measuring capacitor and the first reference capacitor are interconnected in a first bridge circuit, and that the pressure sensor is operable in at least one second operating mode, in which the diaphragm electrode, the counter electrode and the reference electrodes are interconnected with one another in such a way that the diaphragm electrode, together with the at least one first reference electrode, forms a second measuring capacitor for detecting a second measuring pressure.

A feature of the pressure sensor of the present invention relates to expanding the measuring range. The measuring range expansion may advantageously be implemented in that the pressure sensor is operable in two operating modes, which differ from one another with respect to an electrical interconnection of the components of the pressure sensor, as a result of which different measuring capacitors may be used, for example in different measuring pressure ranges. The measuring capacitors may be read out directly. The advantage here is that no changes to the micromechanical sensor element are necessary. Only the interconnection to the application-specific integrated circuit (ASIC) of the pressure sensor on which the micromechanical sensor element is situated, or circuit structures in the ASIC, must be changed or added.

In one specific embodiment of the present invention, in the pressure sensor, the first operating mode is assigned to a first measuring pressure range, and the second operating mode is assigned to a second measuring pressure range. For example, the first operating mode may be used in the range of ambient pressure conditions. The second operating mode may, for example, be provided for higher pressures than the first operating mode.

In one specific embodiment of the present invention, in the pressure sensor, the diaphragm and the counter electrode are designed and situated in such a way that the first measuring capacitor is measuring pressure-dependent in the first operating mode and measuring pressure-independent in the second operating mode. The diaphragm and the at least one first reference electrode are designed and situated in such a way that the second measuring capacitor is measuring pressure-dependent in the second operating mode. This may be implemented, for example, in that the diaphragm electrode rests on the counter electrode starting at a certain pressure, by which the first measuring capacitor is short-circuited. The second measuring capacitor is then designed so that, in the event of a short circuit, the micromechanical sensor element is re-interconnected and operated.

In one specific embodiment of the present invention, in the pressure sensor, switching means (i.e., switch(es)) are provided for the activatable switching between the operating modes of the pressure sensor. The switching of the operating modes may, for example, be implemented by individual switches or a multiplexer. These are typically implemented on the ASIC.

In one specific embodiment of the present invention, in the pressure sensor, the switching means are configured to switch between the operating modes of the pressure sensor as a function of the detected first measuring pressure and/or of the detected second measuring pressure.

In one specific embodiment of the present invention, in the pressure sensor, the switching means are configured to switch between the operating modes of the pressure sensor at predefinable time intervals. Advantageously, measured values of both measuring capacitors may thus be used to enable an efficient switching to a presently preferred operating mode. For example, the first operating mode may generally be activated. The second operating mode, however, is activated at a certain frequency. As a result, both measuring capacitors are available for carrying out a plausibility check of a measuring pressure range, for switching between the measuring pressure ranges, and for error diagnosis.

In one specific embodiment of the present invention, in the pressure sensor, in the first operating mode, a supply voltage is present between the diaphragm electrode and the at least one first reference electrode, and a tap of the bridge circuit is formed between the counter electrode and the at least one second reference electrode. In the second operating mode, the supply voltage is present at the diaphragm electrode and at the counter electrode, and the at least one first reference electrode acts as a measuring tap. The supply voltage may, for example, be a periodic signal, such as a square wave signal. The tap or measuring tap is connected to an evaluation circuit.

In one specific embodiment of the present invention, in the pressure sensor, in the second operating mode, the counter electrode and the at least one second reference electrode are short-circuited. As a result, the second reference electrode may also be short-circuited with the diaphragm electrode or with the diaphragm. As a result, the formation of a Hertzian dipole is avoided in the area of the second measuring capacitor. Advantageously, an interfering influence on the second measuring capacitor and on other elements, such as for example electrical feed lines, may be reduced in the second operating mode of the pressure sensor.

In one specific embodiment of the present invention, in the pressure sensor, in the second operating mode, the second measuring capacitor is interconnected with at least one high-pressure reference capacitor in a second bridge circuit. Advantageously, the pressure sensor may thus have a higher accuracy and a lower susceptibility to interfering effects, such as noise or temperature changes, in the second measuring pressure range.

In one specific embodiment of the present invention, in the pressure sensor, the micromechanical sensor element includes at least two sensor structures, each including a pressure-sensitive diaphragm which spans a cavity in the base material. Each sensor structure is equipped with at least one first measuring capacitor for detecting a first measuring pressure and with a reference capacitor. In the first operating mode, the first measuring capacitors and the reference capacitors of the at least two sensor structures are interconnected in a first full bridge circuit so that the first measuring pressure is differentially detectable. In the second operating mode, the diaphragm electrodes, the counter electrodes and the reference electrodes of each of the at least two sensor structures are interconnected with one another in such a way that the diaphragm electrodes in each case, together with the at least one reference electrode, in each case form a second measuring capacitor for detecting a second measuring pressure. In contrast to conventional approaches including multiple separate sensor structures, the pressure sensor has a space-saving design and is cost-effective to manufacture.

In a method for operating a pressure sensor according to one of the specific embodiments of the present invention, the individual operating modes of the pressure sensor are assigned to defined pressure ranges. In the method, the measuring pressure to be detected is monitored in that the first measuring pressure and/or the second measuring pressure is/are detected and evaluated, that a presently preferred operating mode of the pressure sensor is identified as a function of the evaluation of the detected measuring pressure, and that a switching into the presently preferred operating mode takes place when the pressure sensor is presently in a different operating mode than the preferred operating mode.

In general, not only the present pressure measured value, but also a pressure value averaged over a predetermined time duration is taken into consideration during the measuring pressure evaluation. In this way, too frequent switching between the operating modes may advantageously be avoided, for example when the pressure to be detected is in a range between the first and second measuring pressure ranges. The switching may also be implemented with the aid of a hysteresis. In the process, the switching from one of the pressure ranges into the respective other takes place when a certain first pressure value is exceeded or fallen short of, however the switching in the opposite direction takes place when a certain second pressure value, which deviates from the first pressure value, is exceeded or fallen short of. Too frequent switching may also be avoided in this way.

In one specific embodiment of the present invention, in the method, the pressure sensor is operated in the second operating mode when a short circuit is present between the diaphragm electrode and the counter electrode of the first measuring capacitor, and a switching between the first and second operating modes of the pressure sensor takes place as a function of whether a short circuit is present between the diaphragm electrode and the counter electrode of the first measuring capacitor.

In one specific embodiment of the present invention, in the method, switching between the individual operating modes of the pressure sensor is carried out at predefinable time intervals, and the first measuring pressure or second measuring pressure then detected is evaluated with respect to a monitoring of the function of the pressure sensor and/or a plausibility check of the pressure measurements. Advantageously, a diaphragm breakage, deposits on the diaphragm, blockages of the diaphragm or an interruption in an electrical feed line may be detected as a result of the monitoring of the function.

The pressure sensor and the method for operating a pressure sensor are described in greater detail hereafter based on schematic figures.

DETAILED DESCRIPTION OF EXAMPLE EMBODIMENTS

Figure 1:
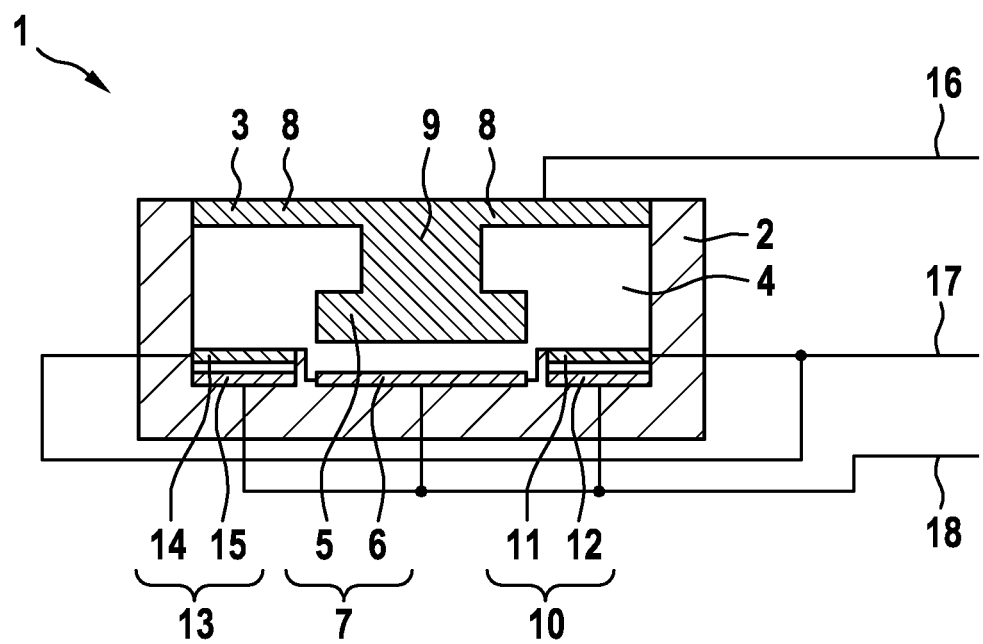
FIG. 1 shows an exemplary micromechanical sensor element of a pressure sensor according to one specific embodiment of the present invention in a cross-sectional view.

FIG. 1 schematically shows an exemplary micromechanical sensor element 1 of a pressure sensor according to one specific embodiment in a cross-sectional view. The pressure sensor may also include a multitude of micromechanical sensor elements 1. For example, micromechanical sensor element 1 may be manufactured with the aid of conventional methods of semiconductor manufacturing.

Micromechanical sensor element 1 includes a base material 2 and at least one diaphragm 3. Base material 2 and diaphragm 3 may, for example, include a semi-conductor material, for example silicon. The diaphragm spans a cavity 4 in base material 2. Diaphragm 3 is designed to be pressure-sensitive and deflectable when a change occurs in an ambient pressure.

Diaphragm 3 includes a diaphragm electrode 5. Diaphragm electrode 5 is, for example, situated inside cavity 4 and has a stamp-like design. However, diaphragm electrode 5 may also have a different design. For example, diaphragm electrode 5 may be designed to be planar and be situated inside cavity 4 at diaphragm 3. Diaphragm electrode 5 may also be at least formed by a portion of diaphragm 3 itself. In this case, the stamp-like structure shown in FIG. 1 is dispensed with, and first measuring capacitor 7 is formed by the at least one portion of diaphragm 3 which forms diaphragm electrode 5 and counter electrode 6. At least one fixed counter electrode 6 is situated inside cavity 4 and, together with diaphragm electrode 5, forms a first measuring capacitor 7 for detecting a first measuring pressure. As a result of diaphragm electrode 5, diaphragm 3 may include a flexible area 8 and a stiff area 9. In this way, the elastic properties of diaphragm 3 may advantageously be modified and adapted.

A reference capacitor 10 is situated in cavity 4. Reference capacitor 10 includes at least one first fixed reference electrode 11 and one second fixed reference electrode 12. In the exemplary specific embodiment of FIG. 1, a further reference capacitor 13 including a further first fixed reference electrode 14 and a further second fixed reference electrode 15 are additionally situated inside cavity 4, which, however, may also be dispensed with. First measuring capacitor 7 and reference capacitor 10 are situated in the immediate vicinity of one another, by which they are exposed to the same environmental influences, for example temperature changes.

The pressure sensor is operable in at least one first and at least one second operating mode. The first and second operating modes differ with respect to an interconnection of electrodes 3, 5, 6, 11, 12, 14, 15 of micromechanical sensor element 1. For switching between the operating modes, electrodes 3, 5, 6, 11, 12, 14, 15 are in each case electrically connected to terminals 16, 17, 18. Diaphragm 3 or diaphragm electrode 5 is connected to a first terminal 16. The at least one first reference electrode 11 is connected to a second terminal 17. The counter electrode and the at least one second reference electrode 12 is connected to a third terminal 18. Terminals 16, 17, 18 may, for example, be electrically connected to a control unit, which is not shown in FIG. 1, and an evaluation circuit, which is not shown, by switching means (switch(es)), which are not shown in FIG. 1 and which are provided for the activatable switching between the operating modes of the pressure sensor.

Figure 2:
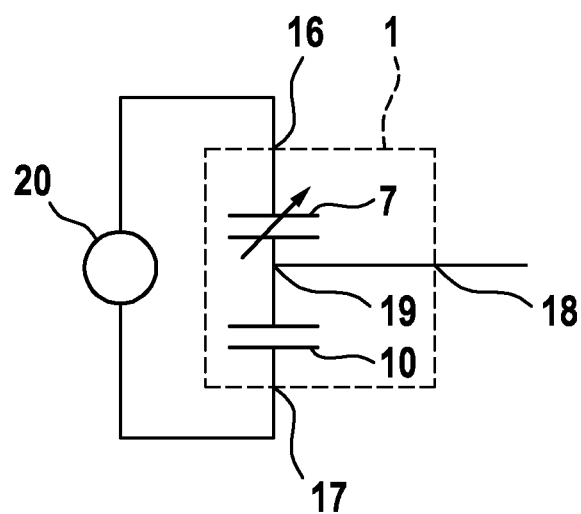
FIG. 2 shows an electrical interconnection of the micromechanical sensor element of FIG. 1 in a first operating mode.

FIG. 2 schematically shows an electrical interconnection of micromechanical sensor element 1 in the first operating mode. The first operating mode may, for example, be assigned to a defined first measuring pressure range, for example a pressure range in the range of 300 mbar to 1100 mbar, which, however, is not necessary. The pressure values and pressure ranges indicated within the scope of this description shall only be understood as exemplary values.

In the first operating mode, for example, a supply voltage, provided, for example, by a control unit 20, may be applied between diaphragm electrode 5 and the at least one first reference electrode 11 via first terminal 16 and second terminal 17, while a tap 19 of a bridge circuit, in which first measuring capacitor 7 and reference capacitor 10 are interconnected, is formed between counter electrode 6 and the at least one second reference electrode 12. Tap 19 at the half bridge is connected to third terminal 18. Micromechanical sensor element 1 may be read out via third terminal 18.

Figure 3:
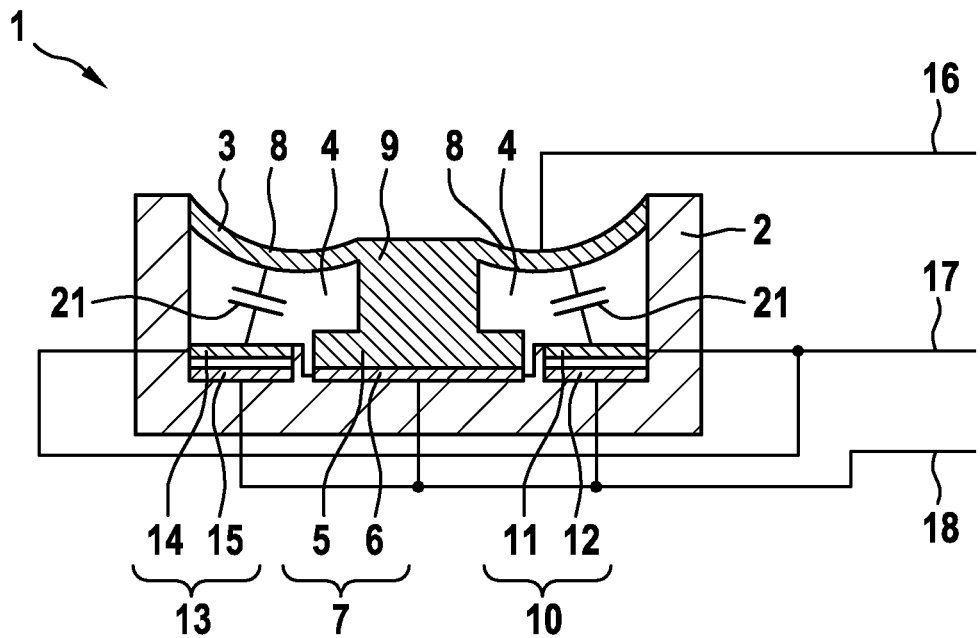
FIG. 3 shows the micromechanical sensor element of FIG. 1 in a second operating mode.

FIG. 3 schematically shows micromechanical sensor element 1 of FIG. 1 in a cross-sectional view while the pressure sensor is being operated in the second operating mode. The second operating mode may, for example, be assigned to a defined second measuring pressure range, such as a high-pressure range, for example a pressure range above 1100 mbar. However, this is not absolutely necessary.

In the second operating mode, diaphragm electrode 5, counter electrode 6 and reference electrodes 11, 12 are interconnected with one another in such a way that diaphragm electrode 5, together with the at least one first reference electrode 11, forms a second measuring capacitor 21 for detecting a second measuring pressure. In the process, at least one section of diaphragm electrode 5, together with first reference electrode 11, forms second measuring capacitor 21. For example, in particular, a section of diaphragm electrode 5, which in one variant may be a section of diaphragm 3, may, together with first reference electrode 11, form second measuring capacitor 21 within flexible area 8 of diaphragm 3, as is indicated by way of example in FIG. 3. In the exemplary specific embodiment of micromechanical sensor element 1 of FIG. 3 including the further reference capacitor 13, diaphragm electrode 5 also forms second measuring capacitor 21 with the further first reference electrode 14. In this case, the capacitances indicated between diaphragm 3 and reference electrodes 11, 14 correspond in each case to half of an overall capacitance which forms second measuring capacitor 21.

In the second operating mode, the supply voltage may, for example, be present at diaphragm electrode 5 and at counter electrode 6, or at first terminal 16 and at third terminal 18, while the at least one first reference electrode 11, and optionally the further first reference electrodes 14, acts as a measuring tap or is electrically connected to second terminal 17.

Diaphragm 3 and counter electrode 6 may be designed and situated in such a way that first measuring capacitor 7 is measuring pressure-dependent in the first operating mode, and measuring pressure-independent in the second operating mode. In the second operating mode, diaphragm 3 and the at least one first reference electrode 11 may be designed and situated in such a way that second measuring capacitor 21 is measuring pressure-dependent in the second operating mode. In this way, a delimitation of a measuring pressure range exists in the first operating mode, for example of a high-resolution, low-pressure measuring range of micromechanical sensor element 1.

This may be implemented, for example, in the micromechanical sensor element 1 in that diaphragm electrode 5 and counter electrode 6 are short-circuited with one another. One option is that an ambient pressure increases in such a way that the diaphragm is deflected until diaphragm electrode 5 comes into contact with counter electrode 6. FIG. 3 illustrates a bending of diaphragm 3 in such a way that diaphragm electrode 5 is short-circuited with counter electrode 6. First measuring capacitor 21 is thus measuring pressure-independent. Since diaphragm 3, despite the short circuit, is still pressure-sensitive, second measuring capacitor 21 may be used to measure an ambient pressure within the scope of the second operating mode. As a result of the use of second measuring capacitor 21 in the second operating mode, a measuring range of the pressure sensor may be expanded, even if, for example, a sensitivity in the second measuring pressure range is lower than in the first measuring pressure range; however, accuracy requirements are also considerably lower in the high-pressure range.

In the second operating mode, diaphragm 3 and the at least one first reference electrode 11 may also be designed and situated in such a way that second measuring capacitor 21 is measuring pressure-dependent in the second operating mode, without a short circuit being present between diaphragm electrode 5 and counter electrode 6. For example, it may suffice for diaphragm electrode 5 to only rest against counter electrode 6, without an electrical short circuit being present. To avoid a short circuit, diaphragm electrode 5 and counter electrode 6 may be coated with an insulating material.

The short circuiting or resting of diaphragm electrode 5 with or at counter electrode 6 may, for example, be established via an evaluation of a measuring signal. In general, the short circuiting or the resting of electrodes 5, 6 of the first measuring capacitor may be precisely determined using additional mechanisms, e.g., the closing of an electrical contact, to be able to precisely establish a transition area, and thereby support the evaluation circuit. As an alternative, the transition to the short circuit or to the resting may also be detected in that a short circuit state or a resting state is described. For this purpose, for example, a calibration may take place prior to a start-up of the pressure sensor to determine a relationship between the ambient pressure and parameters, such as for example the temperature and humidity, and the like, by which it is possible to describe in what pressure range a short circuit occurs in a micromechanical sensor element 1, or in what pressure range diaphragm electrode 5 rests on counter electrode 6.

Figure 4:
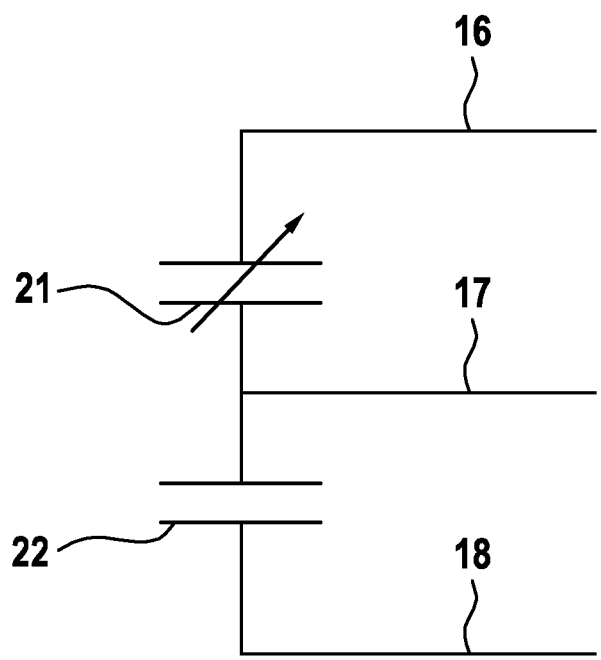
FIG. 4 shows an electrical interconnection of a second measuring capacitor of the micromechanical sensor element in the second operating mode.

FIG. 4 schematically shows an electrical interconnection of second measuring capacitor 21 of micromechanical sensor element 1 in the second operating mode.

Second measuring capacitor 21 shown in FIG. 4 is connected to first terminal 16 and to second terminal 17. In the second operating mode, for example, a supply voltage may be applied to first terminal 16, while second measuring capacitor 21 may be connected via the second terminal to the evaluation circuit.

FIG. 4 additionally shows that, in the second operating mode, second measuring capacitor 21 is interconnected with at least one high-pressure reference capacitor 22 in a second bridge circuit. High-pressure reference capacitor 22 offers the above-mentioned advantages. High-pressure reference capacitor 22 may be both an integral part of micromechanical sensor element 1 and be situated, together with micromechanical sensor element 1, on an application-specific integrated circuit (ASIC) of the pressure sensor. However, high-pressure reference capacitor 22 may also be dispensed with; in this case, third terminal 18 is also dispensed with.

Figure 5:
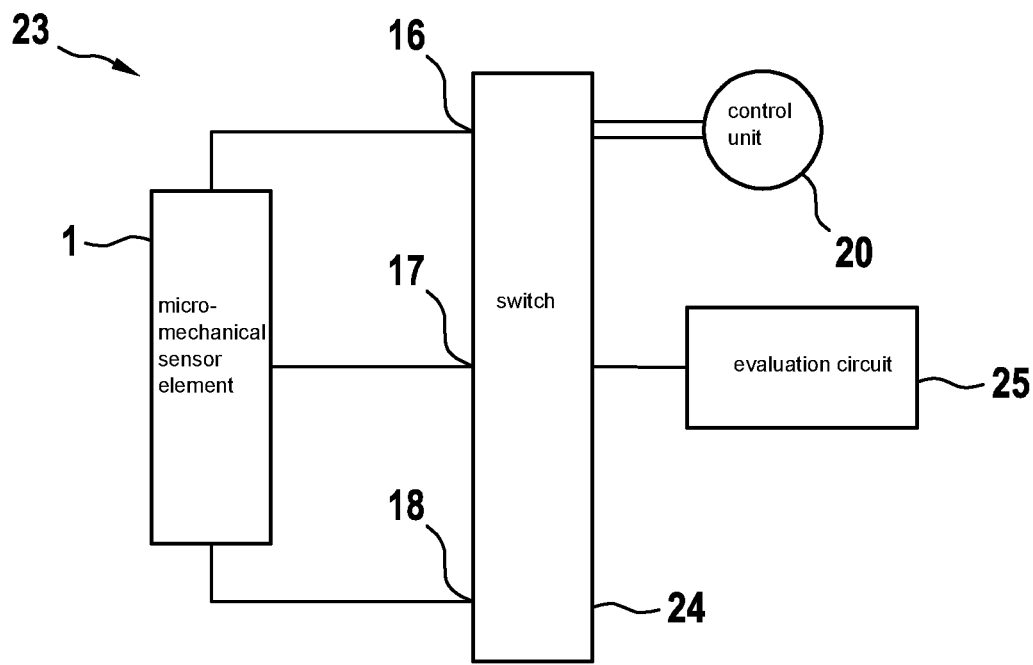
FIG. 5 shows an exemplary pressure sensor in accordance with an example embodiment of the present invention.

FIG. 5 schematically shows an exemplary pressure sensor 23 according to one possible specific embodiment. Pressure sensor 23 includes micromechanical sensor element 1 and, in the variant of pressure sensor 23 shown in FIG. 5, a control unit 20, switching means 24, and an evaluation circuit 25.

Switching means 24 are configured to switch between the operating modes of pressure sensor 23, for example as a function of a first measuring pressure detected with the aid of first measuring capacitor 7 and/or of a second measuring pressure detected with the aid of second measuring capacitor 21. Switching means 24 may be a multitude of switches, which may be designed as multiplexers. In the first operating mode, first and second terminals 16, 17 are connected to control unit 20, and third terminal 18 is connected to evaluation circuit 25. In the second operating mode, first terminal 16 and third terminal 18 are connected to control unit 20, and second terminal 17 is connected to evaluation circuit 25. Switching means 24 may be configured to switch between the operating modes of pressure sensor 23 at predefinable time intervals.

Control unit 20 may, for example, be designed to provide a periodic signal, for example a square wave signal, as the supply voltage. Using switching means 24, the supply voltage is fed via first and second terminals 16, 17 or via first terminal 16 and third terminal 18 in accordance with an operating mode. Evaluation circuit 25 may include an amplifier and/or an analog-to-digital converter. Evaluation circuit 25 is designed to detect and evaluate an output voltage and to provide an analog or digital measured value, which was measured based on first measuring capacitor 7 or second measuring capacitor 21.

Figure 6:
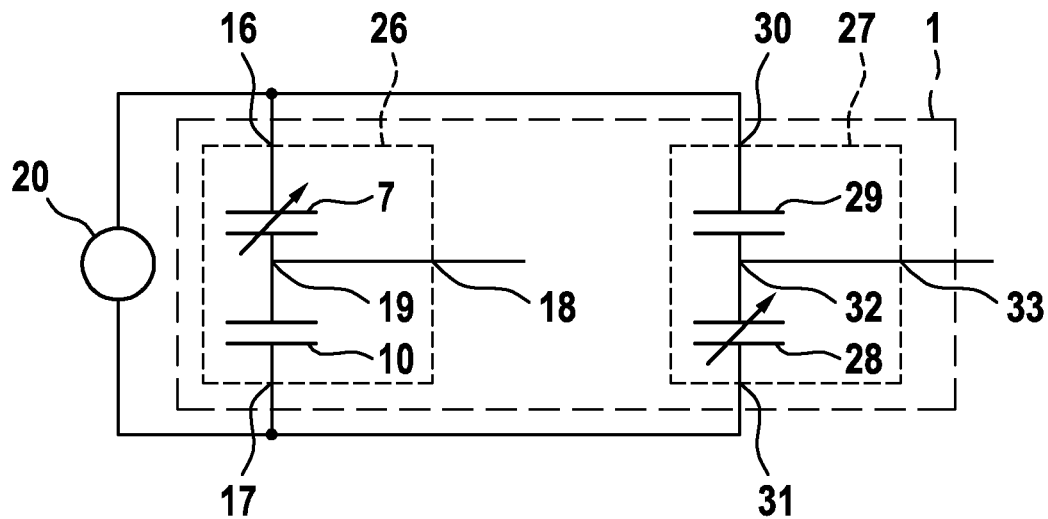
FIG. 6 shows components of an exemplary pressure sensor according to one further specific embodiment of the present invention including a full bridge circuit.

Pressure sensor 23 is not limited to the topologies shown in FIGS. 1 through 5. FIG. 6 schematically shows integral components of an exemplary pressure sensor 23 according to a further specific embodiment including a micromechanical sensor element 1, which includes a full bridge circuit in the first operating mode.

Pressure sensor 23 includes a micromechanical sensor element 1, which includes at least two sensor structures 26, 27, each including a pressure-sensitive diaphragm 3 spanning a shared cavity 4 in base material 2. Each sensor structure 26, 27 is equipped with at least one first measuring capacitor 7, 28 for detecting a first measuring pressure and with a reference capacitor 10, 29. In the first operating mode, first measuring capacitors 7, 28 and reference capacitors 10, 29 of the at least two sensor structures 26, 27 according to FIG. 6 are interconnected in a first full bridge circuit so that the first measuring pressure is differentially detectable. Each sensor structure 26, 27 forms a half bridge. It is advantageous to implement a full bridge circuit in pressure sensor 23 in a compact manner, and not in the form of two separate half bridge circuits.

In the first operating mode, as is shown by way of example in FIG. 6, second sensor structure 27 may be connected via a fourth terminal 30 and a fifth terminal 31 to control unit 20, while first sensor structure 26 is connected via first and second terminals 16, 17 to control unit 20. A further tap 32, which in this case is connected via a sixth terminal 33 of second sensor structure 27 to an evaluation circuit 25, which is not shown, is formed between counter electrode 6 and second reference electrode 12 of second sensor structure 27. First sensor structure 26 is connected via third terminal 18 to evaluation circuit 25. The two first measuring capacitors 7, 28 are driven out-of-phase in this example. They could also be driven in-phase; in this case, first measuring capacitor 28 and reference capacitor 29 of second sensor structure 27 would be interchanged with one another compared to the arrangement of FIG. 6.

The interconnection, in particular, with control unit 20, may be implemented, for example, via switching means 24 according to FIG. 5.

Figure 7:
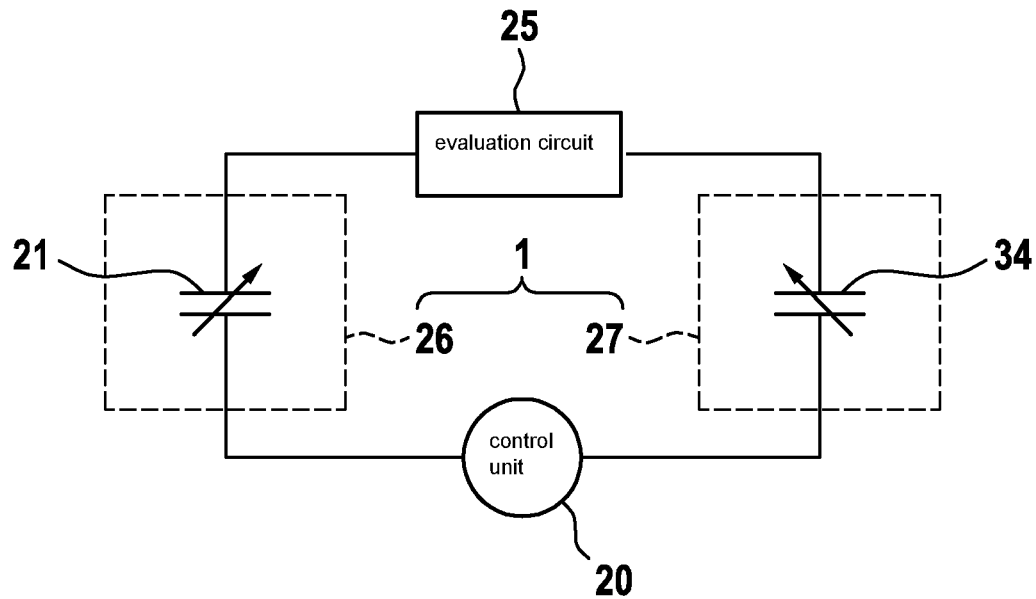
FIG. 7 shows an exemplary electrical interconnection of second measuring capacitors of a micromechanical sensor element including two sensor structures in the second operating mode, in accordance with the present invention.

FIG. 7 schematically shows an exemplary electrical interconnection of second measuring capacitors 21, 34 of a micromechanical sensor element 1 with two sensor structures 26, 27 in the second operating mode.

In the second operating mode, diaphragm electrodes 5, counter electrodes 6 and the reference electrodes of each of the at least two sensor structures 26, 27 are interconnected with one another in such a way that diaphragm electrodes 5, together with the respective at least one reference electrode 11, in each case form a second measuring capacitor 21, 34 for detecting a second measuring pressure. This yields two capacitors, for example high-pressure capacitors, which may be read out differentially. Second measuring capacitors 21, 34 are separate, by way of example, according to FIG. 7 and connected at different poles to control unit 20, and separately to evaluation circuit 25, which, however, is not absolutely necessary. Switching means 24 are not shown in FIG. 7 for the sake of simplicity.

Figure 8:
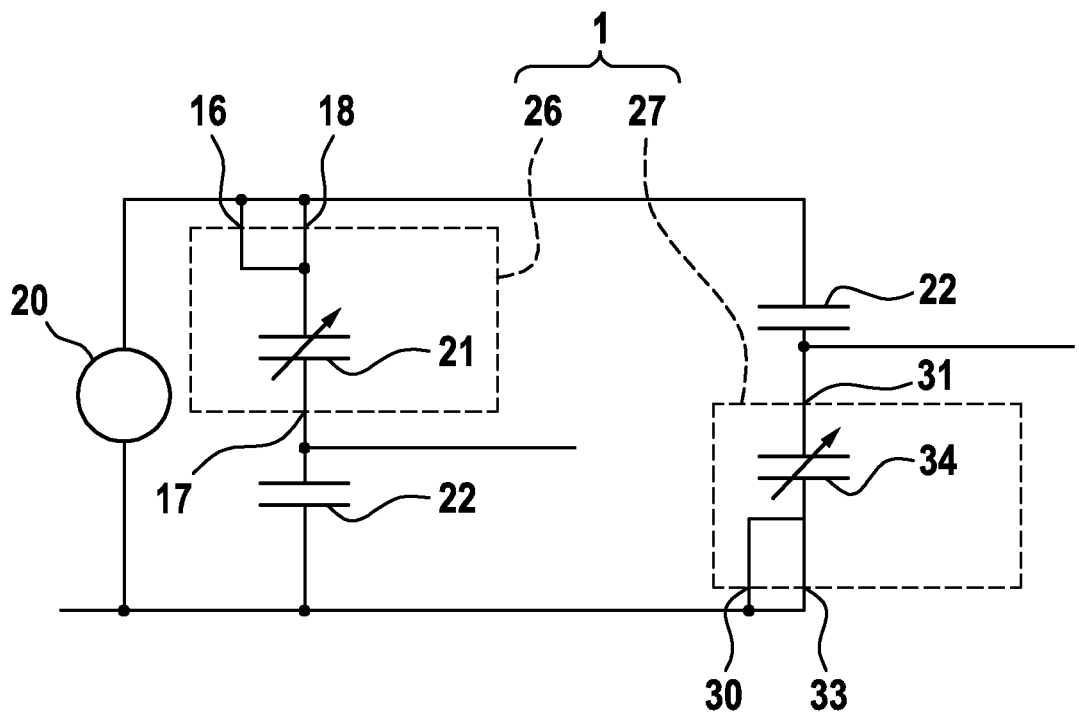
FIG. 8 shows the electrical interconnection of FIG. 7, the sensor structures in each case being connected with a high-pressure reference capacitor in a half bridge circuit.

As is shown in the exemplary embodiment of FIG. 4, second measuring capacitors 21, 34 may also each be interconnected in this case with at least one high-pressure reference capacitor 22 in a second bridge circuit in the second operating mode, so that a differentially readable full bridge is created. FIG. 8 shows this schematically for an exemplary interconnection for the case of a micromechanical sensor element 1 with two sensor structures 26, 27 in the second operating mode. Sensor structures 26, 27 are each connected to a high-pressure reference capacitor 22 in a half bridge circuit, the half bridges forming the second bridge circuit designed as a full bridge circuit.

In the second operating mode, second terminal 17 and fifth terminal 31 are provided for reading out an output voltage. For this purpose, the second terminal and fifth terminal 34 are each connected to a tap at the half bridges, in each case between sensor structure 26, 27 and high-pressure reference capacitor 22. The taps at the half bridges are connectable to evaluation circuit 24, for example. According to the exemplary embodiment of FIG. 9, sensor structures 26, 27 may be connected with their remaining terminals 16, 18, 30, 33 to the control unit.

Figure 9:
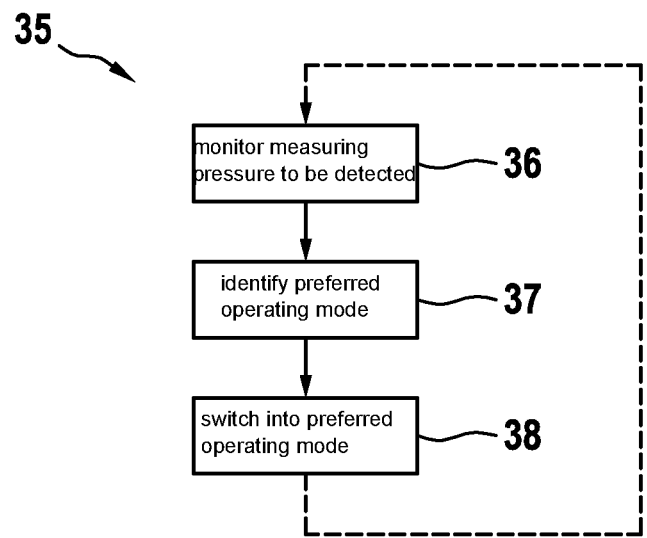
FIG. 9 shows method steps of a method for operating a pressure sensor, in accordance with an example embodiment of the present invention.

FIG. 9 schematically shows method steps 36, 37, 38 of a method 35 for operating a pressure sensor 23 according to one specific embodiment. In method 35, the individual operating modes of pressure sensor 23 are assigned to defined pressure ranges.

In a first method step 36, the measuring pressure to be detected is monitored in that the first measuring pressure and/or the second measuring pressure are detected and evaluated. In a second method step 37, a presently preferred operating mode of pressure sensor 23 is identified as a function of the evaluation of the detected measuring pressure. Within the scope of a third method step 38, a switching into the presently preferred operating mode takes place when pressure sensor 23 is presently in an operating mode other than the preferred operating mode. After the switching into the presently preferred operating mode, method steps 36, 37, 38 may be repeated.

Pressure sensor 23 may, for example, be operated in the second operating mode when a short circuit is present between diaphragm electrode 5 and counter electrode 6 of a first measuring capacitor 7, 28. A switching between the first and second operating modes of pressure sensor 23 may, for example, take place as a function of whether a short circuit is present between diaphragm electrode 5 and counter electrode 6 of a first measuring capacitor 7, 28. In method 35, for example, it is possible to switch between the individual operating modes of the pressure sensor at predefinable time intervals. The detected first measuring pressure or second measuring pressure may be evaluated with respect to a monitoring of the function of pressure sensor 23 and/or a plausibility check of the pressure measurements.

What is claimed is:

1. A pressure sensor, comprising:
   a micromechanical sensor element including at least one pressure-sensitive diaphragm which spans a cavity in a base material and includes a diaphragm electrode;
   a fixed counter electrode situated inside the cavity and, together with the diaphragm electrode, forms a first measuring capacitor configured to detect a first measuring pressure; and
   a reference capacitor situated inside the cavity and includes at least one first fixed reference electrode and at least one second fixed reference electrode;
   the pressure sensor is operable in at least one first operating mode, in which the first measuring capacitor and the first reference capacitor are interconnected in a first bridge circuit, and the pressure sensor is operable in at least one second operating mode, in which the diaphragm electrode, the counter electrode, and the first and second fixed reference electrodes are interconnected with one another in such a way that the diaphragm electrode, together with the at least one first reference electrode, forms a second measuring capacitor configured to detect a second measuring pressure.

2. The pressure sensor as recited in claim 1, wherein the first operating mode is assigned to a first measuring pressure range, and the second operating mode is assigned to a second measuring pressure range.

3. The pressure sensor as recited in claim 1, further comprising:
   a switch for activatable switching between the operating modes of the pressure sensor.

4. The pressure sensor as recited in claim 3, wherein the switch is configured to switch between the first and second operating modes of the pressure sensor as a function of the detected first measuring pressure and/or of the detected second measuring pressure.

5. The pressure sensor as recited in claim 3, wherein the switch is configured to switch between the first and second operating modes of the pressure sensor at predefinable time intervals.

6. The pressure sensor as recited in claim 1, wherein the diaphragm and the counter electrode are configured and situated in such a way that the first measuring capacitor measures pressure-dependent in the first operating mode, and measures pressure-independent in the second operating mode, and the diaphragm and the at least one first reference electrode are configured and situated in such a way that the second measuring capacitor measures pressure-dependent in the second operating mode.

7. The pressure sensor as recited in claim 1, wherein, in the first operating mode, a supply voltage is present between the diaphragm electrode and the at least one first reference electrode, and a tap of the bridge circuit is formed between the counter electrode and the at least one second reference electrode, and, in the second operating mode, the supply voltage is present at the diaphragm electrode and at the counter electrode, and the at least one first reference electrode acts as a measuring tap.

8. The pressure sensor as recited in claim 7, wherein, in the second operating mode, the counter electrode and the at least one second reference electrode are short-circuited.

9. The pressure sensor as recited in claim 1, wherein, in the second operating mode, the second measuring capacitor is interconnected with at least one high-pressure reference capacitor in a second bridge circuit.

10. The pressure sensor as recited in claim 1, wherein:
the micromechanical sensor element includes at least two sensor structures, each of the sensor structures including a respective pressure-sensitive diaphragm spanning a respective cavity in the base material;
each of the sensor structures is equipped with a respective at least one first measuring capacitor configured to detect a respective first measuring pressure, and with a respective reference capacitor;
in the first operating mode, the respective first measuring capacitors and the respective reference capacitors of the at least two sensor structures are interconnected in a first full bridge circuit so that the first measuring pressure is differentially detectable; and
in the second operating mode, diaphragm electrodes, counter electrodes, and reference electrodes of the sensor structures are interconnected with one another in such a way that diaphragm electrodes, together with the respective at least one first reference electrode, form a second measuring capacitor for detecting a second measuring pressure.

11. A method for operating a pressure sensor a micromechanical sensor element including at least one pressure-sensitive diaphragm which spans a cavity in a base material and includes a diaphragm electrode, a fixed counter electrode situated inside the cavity and, together with the diaphragm electrode, forms a first measuring capacitor configured to detect a first measuring pressure, and a reference capacitor situated inside the cavity and includes at least one first fixed reference electrode and at least one second fixed reference electrode, wherein the pressure sensor is operable in at least one first operating mode, in which the first measuring capacitor and the first reference capacitor are interconnected in a first bridge circuit, and the pressure sensor is operable in at least one second operating mode, in which the diaphragm electrode, the counter electrode, and the first and second fixed reference electrodes are interconnected with one another in such a way that the diaphragm electrode, together with the at least one first reference electrode, forms a second measuring capacitor configured to detect a second measuring pressure, each of the first and second operating modes of the pressure sensor being assigned to defined pressure ranges, the method comprising:
monitoring the measuring pressure to be detected including detecting and monitoring the first measuring pressure and/or the second measuring pressure is/are detected and evaluated;
identifying a presently preferred operating mode of the pressure sensor as a function of the evaluation of the detected measuring pressure; and
switching into the presently preferred operating mode takes place when the pressure sensor is presently in a different operating mode than the preferred operating mode.

12. The method as recited in claim 11, wherein the pressure sensor is operated in the second operating mode when a short circuit is present between the diaphragm electrode and the counter electrode of the first measuring capacitor, and a switching between the first and second operating modes of the pressure sensor takes place as a function of whether a short circuit is present between the diaphragm electrode and the counter electrode of the first measuring capacitor.

13. The method as recited in claim 11, wherein switching between the first and second operating modes of the pressure sensor is carried out at predefinable time intervals, and the first measuring pressure or second measuring pressure then detected is evaluated with respect to a monitoring of a function of the pressure sensor and/or a plausibility check of pressure measurements.

\* \* \* \* \*